(12) United States Patent
Takizawa

(10) Patent No.: US 7,732,979 B2
(45) Date of Patent: Jun. 8, 2010

(54) LINEAR DRIVE ULTRASONIC MOTOR

(75) Inventor: Hiroyuki Takizawa, Chofu (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 12/426,702

(22) Filed: Apr. 20, 2009

(65) Prior Publication Data

US 2009/0267456 A1    Oct. 29, 2009

(30) Foreign Application Priority Data

Apr. 24, 2008    (JP)    ............................ 2008-114301

(51) Int. Cl.
*H02N 2/00* (2006.01)
(52) U.S. Cl. .............................. 310/323.02; 310/323.17
(58) Field of Classification Search ............ 310/323.01, 310/323.02, 323.05, 323.06, 323.17, 323.18, 310/340, 348
See application file for complete search history.

(56) References Cited

U.S. PATENT DOCUMENTS

| | | | |
|---|---|---|---|
| 4,672,256 A * | 6/1987 | Okuno et al. .......... 310/323.07 |
| 5,191,688 A * | 3/1993 | Takizawa et al. ........... 29/25.35 |
| 6,218,767 B1 * | 4/2001 | Akada et al. ........... 310/323.02 |
| 7,466,063 B2 * | 12/2008 | Kim et al. .............. 310/323.17 |
| 2009/0267454 A1 * | 10/2009 | Takizawa ............... 310/323.02 |

FOREIGN PATENT DOCUMENTS

JP    3524248    2/2004

* cited by examiner

*Primary Examiner*—Thomas M Dougherty
(74) *Attorney, Agent, or Firm*—Scully, Scott, Murphy & Presser, P.C.

(57) ABSTRACT

A linear drive ultrasonic motor includes at least an ultrasonic vibrator having a piezoelectric element, a driven member which is driven by a frictional force between the driven member and the ultrasonic vibrator, a pressing member which presses the ultrasonic vibrator such that a frictional force is generated between the ultrasonic vibrator and the driven member, a case member which accommodates the ultrasonic vibrator, the pressing member, and the driven member, and a coupling member which is coupled with the driven member at an interior of the case member. The case member includes an opening portion for allowing a part of the coupling member to pass through.

4 Claims, 3 Drawing Sheets

10

LINEAR DRIVE ULTRASONIC MOTOR

CROSS-REFERENCE TO RELATED APPLICATION

The present application is based upon and claims the benefit of priority from the prior Japanese Patent Application No. 2008-114301 filed on Apr. 24, 2008; the entire contents of which are incorporated herein by reference.

BACKGROUND OF THE INVENTION

1. Field of the Invention

The present invention relates to a linear drive ultrasonic motor

2. Description of the Related Art

A vibration apparatus in Japanese Patent No. 3524248 Specification (FIG. 3A and FIG. 3B) can be cited as an example of a conventional linear drive ultrasonic motor. Here, FIG. 3A and FIG. 3B are diagrams showing a structure of the conventional linear drive ultrasonic motor, where FIG. 3A is an exploded perspective view and FIG. 3B is a vertical cross-sectional view.

The vibration apparatus shown in FIG. 3A and FIG. 3B includes a case 906 which accommodates a vibrating body 901, a mobile object 904 which passes through the case 906 and makes a contact with the vibrating body 901, and a pressing spring 905 which generates pressing force (a bias) which brings the mobile object 904 and the vibrating body 901 in a pressurized contact. The pressing spring 905 is installed at an outer side of the case 906. An opening portion is formed in a side of the case 906, facing the vibrating body 901, and the pressing force of the pressing spring 905 acts on the vibrating body 901 through the opening portion. In other words, this vibration apparatus has a structure in which, the pressing spring 905 is installed on the outer side of the case 906 while covering the opening portion of the case 906, and a deformed portion (a plane surface portion covering the opening portion) of the pressing spring 905 which generates the pressing force is exposed.

However, in the vibration apparatus described in Japanese Patent No. 3524248 Specification, when installed on some external apparatus, for avoiding a change in the pressing force of the pressing spring 905, there is a restriction (limitation) of designing that the pressing spring 905 does not make a contact with a member of the external apparatus, in other words, that an arrangement is to be made to avoid pressing spring 905. Furthermore, for generating sufficient pressing force such that the mobile object 904 can be moved, it is not possible to fix a side of the pressing spring 905 to the external apparatus. As the side of the pressing spring 905 cannot be fixed, the protection of the contents of the case 906 has not been sufficient.

SUMMARY OF THE INVENTION

The present invention is made in view of the abovementioned circumstances, and an object of the present invention is to provide a small-size linear drive ultrasonic motor which is capable of achieving a stable pressing force, and which has fewer restrictions regarding a relationship with an external apparatus. Moreover, an object of the present invention is to provide a linear drive ultrasonic motor in which it is possible to protect assuredly the contents of a case member.

To solve the abovementioned issues and to achieve the object, according to the present invention, there is provided a linear drive ultrasonic motor including at least an ultrasonic vibrator having a piezoelectric element, a driven member which is driven by a frictional force between the driven member and the ultrasonic vibrator, a pressing member which presses the ultrasonic vibrator such that a frictional force is generated between the ultrasonic vibrator and the driven member, a case member which accommodates the ultrasonic vibrator, the pressing member, and the driven member, and a coupling member which is coupled with the driven member at an interior of the case member, and the case member includes an opening portion for allowing a part of the coupling member to pass through.

In the linear drive ultrasonic motor according to the present invention, it is preferable that the opening portion for allowing the part of the coupling member to pass through opens in a direction different from a direction of driving of the driven member and a direction of pressing by the pressing member.

In the linear drive ultrasonic motor according to the present invention, the coupling member may have a site facing the ultrasonic vibrator and the driven member, at which a predetermined function element is installed.

BRIEF DESCRIPTION OF THE DRAWINGS

FIG. 3A is an exploded perspective view, and FIG. 3B is a vertical cross-sectional view.

DETAILED DESCRIPTION OF THE PREFERRED EMBODIMENTS

An ultrasonic motor 10 (linear drive ultrasonic motor) according to an embodiment of the present invention will be described below while referring to FIG. 1 and FIG. 2. However, the present invention is not restricted by the embodiment described below. Here, FIG. 1 is an exploded perspective view showing a structure of the ultrasonic motor 10, and FIG. 2 is a perspective view showing an outward appearance of the ultrasonic motor 10 in an assembled state.

Figure 1:
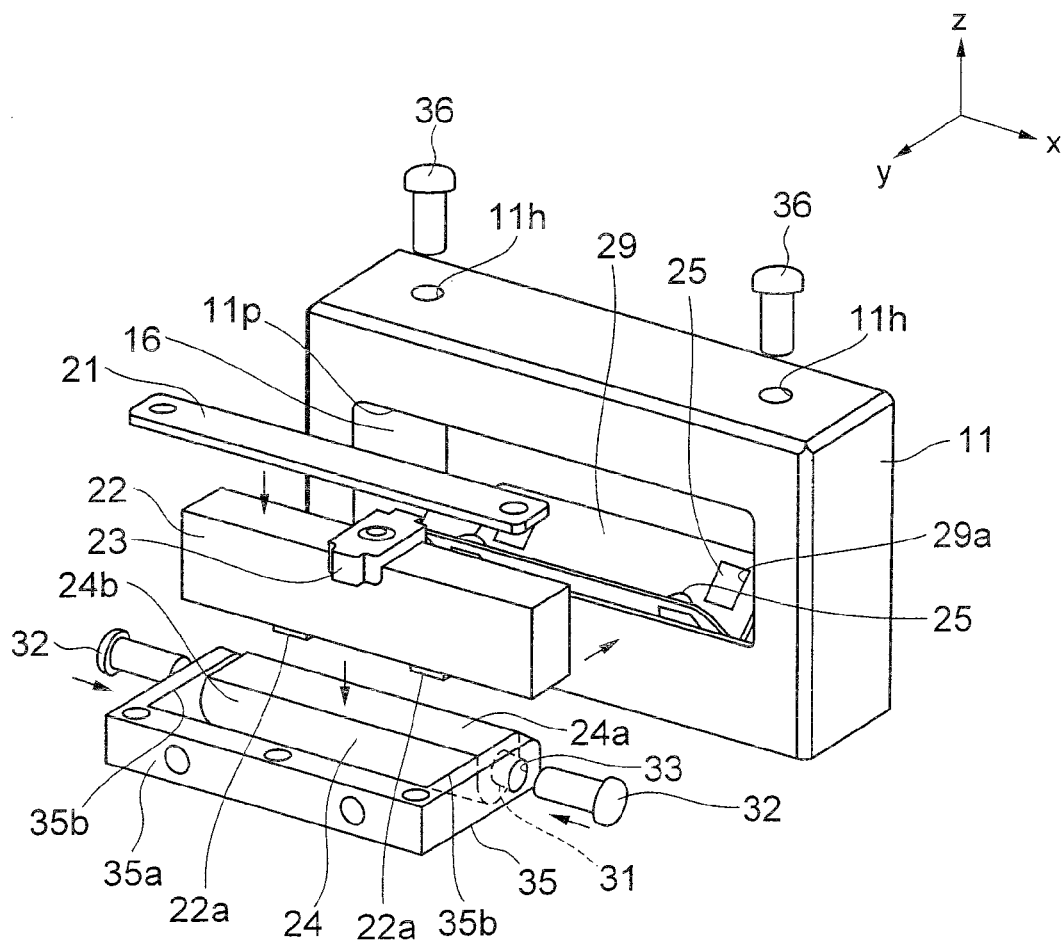
FIG. 1 is an exploded perspective view showing a structure of an ultrasonic motor according to an embodiment of the present invention.
Figure 2:
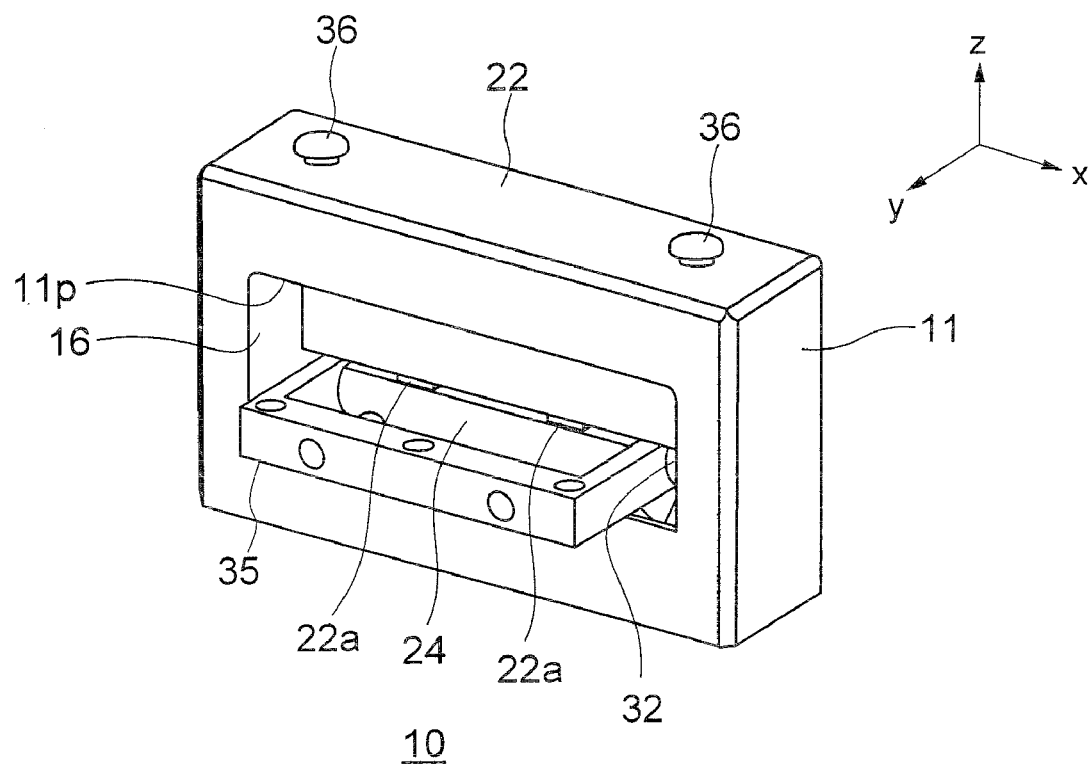
FIG. 2 is a perspective view showing an outward appearance of an ultrasonic motor in an assembled state.
Figure 3B:
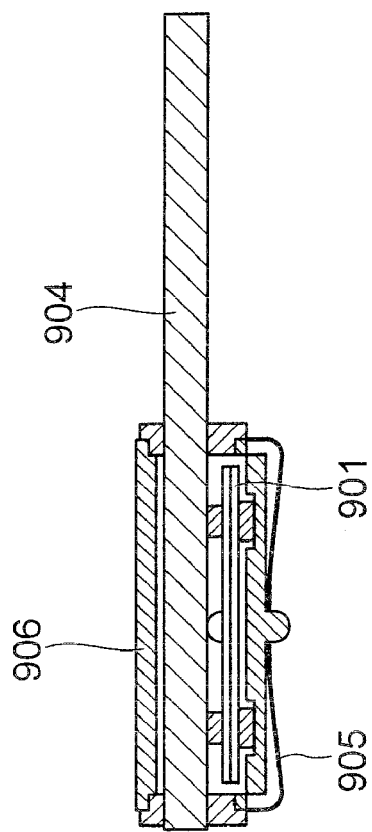
FIG. 3A and FIG. 3B are diagrams showing a structure of a conventional linear drive ultrasonic motor where.
Figure 3A:
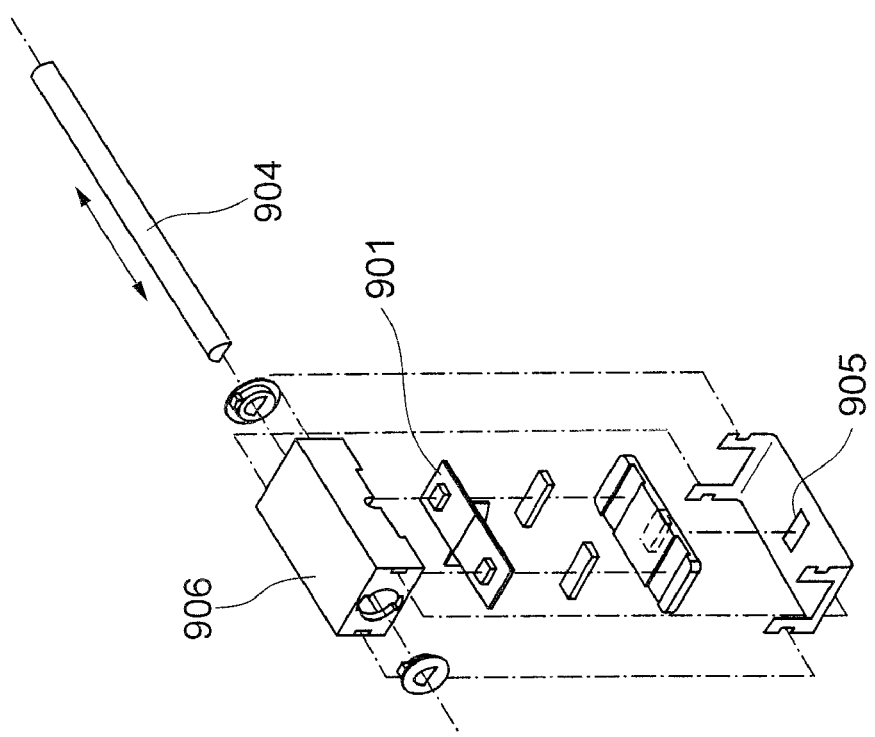

As shown in FIG. 1, the ultrasonic motor 10 includes a vibrator 22 as an ultrasonic vibrator, a driven member 24, a pressing member 21, a case member 11, and rolling members 25. Each member will be described below in detail.

Both the vibrator 22 and the case member 11 have a substantially rectangular parallelepiped outer shape, and an accommodating recess 16 is formed at an interior of the case member 11. The pressing member 21, the vibrator 22, a guiding member 29, and the rolling members 25 are accommodated in the accommodating recess 16, in this order from an upper side, in a direction of height (z direction in FIG. 1) of the ultrasonic motor 10. In the embodiment, the case member 11 is made of one member. However, it is also possible to form the case member 11 by assembling a plurality of members.

The pressing member 21 is a plate spring in the form of a long plate, and is disposed such that a longitudinal direction thereof is along a longitudinal direction (x direction in FIG. 1(a)) of the ultrasonic motor 10 and the case member 11. The rolling members 25 are disposed such that two rolling members 25 each are in two rows along the longitudinal direction of the case member 11.

The guiding member 29 has a shape formed by bending the long plate shaped member with a direction of width as a center. A guide hole 29a which is a through hole is provided at a position corresponding to the rolling member 25 when the guiding member 29 is accommodated inside the accommodating recess 16 of the case member 11 such that a bending portion is disposed at a lower side. It is preferable that a position of the guiding member 29 is fixed by being engaged with an engaging portion (not shown in the diagram) provided inside the accommodating recess 16. According to this structure, inside the accommodating recess 16, the four rolling members 25 being pierced from a lower side up to an upper side of the guide hole 29a of the guiding member 29, the four rolling members 25 are positioned in a state of being capable of rolling.

The driven member 24 is a member in a form of a shaft having a cross-sectional shape of an English alphabet D. A flat surface portion 24a of the driven member 24 makes a contact with the vibrator 22 via a drive element 22a, and a curved surface portion 24b of the driven member 24 is in contact with the rolling member 25.

On the other hand, inside the accommodating recess 16 of the case member 11, the driven member 24 is in contact with and supported by the rolling member 25 which has protruded at an upper side of the guide hole 29a of the guiding member 29. The driven member 24 is capable of moving in the longitudinal direction, by being supported by the rolling member 25 which is disposed along the longitudinal direction of the case member 11.

An upper surface at both-end portions in the longitudinal direction of the pressing member 21 can be pressed by pressing screws 36 (pressurizing members). A front tip of the pressing screw 36 is extended up to an inside of the accommodating recess 16, through a screw hole 11h which is a through hole provided in an upper surface of the case member 11. Moreover, the pressing member 21 is disposed such that a lower surface of a central portion in the longitudinal direction thereof makes a contact with a supporting member 23 for positioning of the vibrator 22. Here, the supporting member 23 is fixed at a center in the longitudinal direction (x direction in FIG. 1(a)) of the vibrator 22. Moreover, the vibrator 22 is formed of an ultrasonic vibrator (such as a piezoelectric element). A driving method of the ultrasonic vibrator being hitherto known, in the following diagram, an electrical wiring for driving the vibrator 22 is omitted. Moreover, an engaging groove (not shown in the diagram) in which a projected portion of the supporting member 23 is engaged is formed inside the accommodating recess 16 of the case member 11.

As shown in FIG. 1 and FIG. 2, a coupling portion 31 for coupling a coupling member 35 of an external apparatus is provided at both end portions of the driven member 24. A screw hole 33 (coupling portion) for inserting a coupling screw 32 is provided in the coupling member 35, at a position corresponding to the coupling portion 31. Consequently, by inserting two coupling screws 32 into the two screw holes 33 of the coupling member 35, and by screwing a front-end portion of the coupling screws 32 into the coupling portion 31 of the driven member 24, it is possible to fix the coupling member 35 to the driven member 24. Accordingly, since the coupling member 35 is driven together with the driven member 24, it is possible to realize a linear mobile apparatus.

Here, the coupling member 35 has a site facing the vibrator 22 and the driven member 24, which is a site at which a predetermined functional element is installed. Concretely, the coupling member 35 has a shape of an English alphabet C in a plan view, and includes a main-body portion 35a which is disposed along the vibrator 22 and the driven member 24, and two arm portions 35b extended toward the driven member 24 from both end portions of the main-body portion 35a. The main-body portion 35a is extended along the longitudinal direction (x direction) of the case member 11, and forms an area facing the vibrator 22 and the driven member 24, between the vibrator 22 and the driven member 24. It is possible to install a predetermined function element apart form an external apparatus on the main-body portion 35a.

Moreover, an opening portion 11p for allowing a part of the coupling member 35 to pass through is provided in the case member 11. The opening portion 11p opens in a direction (y direction) orthogonal to both the direction of pressing (z direction) by the pressing member 21 and a direction of driving of the driven member 24. The opening portion 11p may not open in the direction orthogonal to both the direction of pressing by the pressing member 21 and the direction of driving of the driven member 24, and may open in a different direction or a direction intersecting.

It is preferable that the opening portion 11p has a size and shape which allows a part of at least the coupling portion 35 to pass through, it is more preferable that the opening portion 11p has a size and shape which allows a unit which has supported the pressing member 21 on the supporting member 23 fixed to the vibrator 22, to pass through. Moreover, the opening portion 11p may be provided in one surface of the case member 11 or can be provided on two or more than two surfaces of the case member. In a case of providing a plurality of openings lip, the size and the shape of each openings 11p may be the same or may be different. In a case of forming the openings 11p of different sizes and shapes, it is preferable that the size and the shape of at least one opening 11p allows the part of at least the coupling member 35 to pass through.

Assembling of the ultrasonic motor 10 having the above-mentioned structure is carried out as follows.

First of all, the pressing portion 21 is put into the accommodating recess 16 of the case member 11 through the opening portion 11p. Next, the vibrator 22 is fixed to the case member 11 by fitting the projected portion of the supporting member 23 and the engaging portion of the case member 11. Since the projected portion of the supporting member 23 and the engaging portion of the case member 11 are fitted, it is possible to handle integrally in this state.

Next, the driven member 24 and the coupling member 35 which is coupled in advance with the driven member 24 are inserted through the opening portion 11p. The driven member 24 which is inserted is supported by the rolling member 25. Furthermore, a pressing force by the pressing member 21 is set to a desired value by adjusting an amount of the pressing screw 36 extended into the accommodating recess 16. After setting the pressing force, it is possible to fix the pressing screw 36 by adhering to the screw hole 11h of the case member 11. The adjustment of the pressing force can be carried out by changing material and a shape of the pressing member 21.

The case member 11 has a sufficiently high stiffness than a stiffness of the pressing member 21, and even when the case member 11 makes a contact with a member of an external unit which is not shown in the diagram, there is not change in an amount of bending of the pressing member 21. Therefore, a degree of freedom of designing of an external apparatus is improved. Moreover, since the pressing member 21 is not exposed to an outside of the case member 11, it is possible to use for positioning of installing by putting an outer shape of the case member 11 on the external apparatus. Furthermore, it is also possible install directly on the external apparatus by providing an installation hole in the case member 11.

When a driven member is movable, a structure in which a rolling member is not provided is also possible. For instance, it is possible to adopt a structure in which a hemispherical member which does not roll is provided, or in the second case member, a portion in contact with the driven member is provided with a hemispherical projection, or a contact portion is let to be a smooth surface.

In the structures described above, since the frictional force is generated between the vibrator 22 and the driven member 23 by the pressing member 21 pressing the vibrator 22 with respect to the driven member 24, due to the vibrations of the vibrator 22, the driven member 24 moves in the longitudinal direction thereof. Furthermore, the driven member 24 being moved while being supported by the rolling member 25, it is possible to achieve a stable pressing force.

Moreover, since the structure is such that not only the vibrator 22 and the pressing member 21 but also the driven member 24 is accumulated in one member, a relative positioning accuracy of these members is improved, which leads to an improvement in a motor performance and reliability. Furthermore, by providing the coupling member 35 and the opening 11p through which the coupling member 35 passes, it is possible to make easy jobs at the time of assembling and maintenance.

Moreover, it is possible to install a predetermined function element in the coupling member 35, and when a sensor is installed as a function element, it is possible to monitor mounting state and a driving state.

Since it is possible to fix the case member 11 to an external apparatus, it is applicable to a wide range of linear mobile apparatuses while achieving stably the pressing force by the pressing member 21.

Generally, in an ultrasonic motor apparatus, to form a unit structure in which main components are enclosed in a package is effective from points of versatility and stabilization of characters, and making a size small (and a size reduction) has been sought. Whereas, in a conventional ultrasonic motor, by making a size small in a state of the pressing member (bias applying member) encapsulated in the case member, an unevenness in pressing force is susceptible to become substantial, thereby making it difficult. However, a function of protecting the contents as a case with the pressing member in a state of being installed and exposed in the case is insufficient.

Whereas, in the ultrasonic motor according to the embodiment described above, it is possible to realize a unit structure in which it is possible to carry out positioning of the pressing member 21 easily, and the assembling and maintenance are also simple. In other words, the vibrator 22 is guided an accommodated toward an opening portion of the case member 11 in the form of a box, and the pressing member 21 is guided and accommodated toward a side opposite to the opening portion of the case member 11. Accordingly, it is possible to make the size small, as well as it is possible to fix the case member 11 to the external apparatus, and using for positioning, for the case member 11 which is a stiff body to protect by covering each member including the pressing member 21.

Furthermore, since the vibrator 22 makes a contact with the driven member 24 by the pressing force of the pressing member 21, in an enclosed space called the case member 11 made of one member, it is possible to prevent a generation of an abnormal noise. Moreover, by regulating one or both of the pressing member 21 and the vibrator 22, it is possible to suppress a generation of resonance which is unnecessary for a precision driving of the driven object 24. Furthermore, by the structure in which, the vibrator 22 is disposed between the pressing member 21 and the driven member 24, a movement of the driven member 24 becomes smooth.

As it has been described above, the linear drive ultrasonic motor according to the present invention is suitable for a highly precise driving of a small-size equipment.

The linear drive ultrasonic motor according to the present invention shows an effect that it is possible to achieve a stable pressing force, and there are fewer restrictions regarding a relationship with an external apparatus, and it is possible to make a size small, and furthermore, it is possible to protect assuredly the contents of the case member.

What is claimed is:

1. A linear drive ultrasonic motor comprising at least:
an ultrasonic vibrator having a piezoelectric element;
a driven member which is driven by a frictional force between the driven member and the ultrasonic vibrator;
a pressing member which presses the ultrasonic vibrator such that a frictional force is generated between the ultrasonic vibrator and the driven member;
a case member which accommodates the ultrasonic vibrator, the pressing member, and the driven member; and
a coupling member which is coupled with the driven member at an interior of the case member, wherein
the case member includes an opening portion for allowing a part of the coupling member to pass through.

2. The linear drive ultrasonic motor according to claim 1, wherein the opening portion for allowing the part of the coupling member to pass through opens in a direction different from a direction of driving of the driven member and a direction of pressing by the pressing member.

3. The linear drive ultrasonic motor according to claim 1, wherein the coupling member has a site facing the ultrasonic vibrator and the driven member, at which a predetermined function element is installed.

4. The linear drive ultrasonic motor according to claim 2, wherein the coupling member has a site facing the ultrasonic vibrator and the driven member, at which a predetermined function element is installed.

* * * * *